United States Patent
Park et al.

(10) Patent No.: US 10,276,870 B2
(45) Date of Patent: Apr. 30, 2019

(54) COMPOSITE CATHODE ACTIVE MATERIAL, LITHIUM BATTERY INCLUDING THE SAME, AND PREPARATION METHOD THEREOF

(71) Applicant: Samsung Electronics Co., Ltd., Suwon-si, Gyeonggi-do (KR)

(72) Inventors: Jun-ho Park, Gyeongsangnam-do (KR); Jun-young Mun, Seoul (KR); Jin-hwan Park, Seoul (KR); Jae-gu Yoon, Suwon-si (KR)

(73) Assignee: SAMSUNG ELECTRONICS CO., LTD., Suwon-si, Gyeonggi-Do (KR)

(*) Notice: Subject to any disclaimer, the term of this patent is extended or adjusted under 35 U.S.C. 154(b) by 129 days.

(21) Appl. No.: 14/311,491

(22) Filed: Jun. 23, 2014

(65) Prior Publication Data

US 2015/0037680 A1 Feb. 5, 2015

(30) Foreign Application Priority Data

Jul. 31, 2013 (KR) .................. 10-2013-0091162

(51) Int. Cl.

| H01M 4/58 | (2010.01) |
|---|---|
| H01M 4/583 | (2010.01) |
| H01M 4/13 | (2010.01) |
| H01M 4/131 | (2010.01) |
| H01M 4/133 | (2010.01) |
| H01M 4/1391 | (2010.01) |
| H01M 4/1393 | (2010.01) |

(Continued)

(52) U.S. Cl.
CPC .......... *H01M 4/583* (2013.01); *H01M 4/131* (2013.01); *H01M 4/133* (2013.01); *H01M 4/1391* (2013.01); *H01M 4/1393* (2013.01); *H01M 4/366* (2013.01); *H01M 4/505* (2013.01); *H01M 4/525* (2013.01); *H01M 10/052* (2013.01); *Y02T 10/7011* (2013.01)

(58) Field of Classification Search
None
See application file for complete search history.

(56) References Cited

U.S. PATENT DOCUMENTS

| 6,783,890 B2 * | 8/2004 | Kweon | ............... H01M 4/0471 429/218.1 |
| 2009/0305132 A1 * | 12/2009 | Gauthier | ................. H01M 4/04 429/207 |

(Continued)

FOREIGN PATENT DOCUMENTS

| CN | 102227022 A | 10/2011 |
| JP | 2007-213859 A | 8/2007 |

(Continued)

OTHER PUBLICATIONS

Huang et al., "High-rate properties of Li1.95FeSiO4/C/CNTs composite as cathode material for lithium-ion batteries", Solid State Ionic, 220, 2012, pp. 18-22.

(Continued)

*Primary Examiner* — Daniel S Gatewood
(74) *Attorney, Agent, or Firm* — Cantor Colburn LLP

(57) ABSTRACT

A composite cathode active material including: a composite oxide capable of intercalation and deintercalation of lithium; a carbon nanostructure; and a material which is chemically inert to lithium.

17 Claims, 5 Drawing Sheets

(51) Int. Cl.
  *H01M 4/36* (2006.01)
  *H01M 4/50* (2010.01)
  *H01M 4/505* (2010.01)
  *H01M 4/52* (2010.01)
  *H01M 4/525* (2010.01)
  *H01M 10/05* (2010.01)
  *H01M 10/052* (2010.01)

(56) References Cited

U.S. PATENT DOCUMENTS

| 2011/0042609 | A1* | 2/2011 | Park | H01M 4/366 |
| | | | | 252/182.1 |
| 2011/0111298 | A1* | 5/2011 | Lopez | H01M 4/131 |
| | | | | 429/221 |
| 2011/0143202 | A1 | 6/2011 | Farmer et al. | |
| 2012/0032118 | A1 | 2/2012 | Fichtner et al. | |
| 2012/0107680 | A1* | 5/2012 | Amiruddin | H01M 4/386 |
| | | | | 429/206 |
| 2013/0183579 | A1* | 7/2013 | Kim | H01M 4/131 |
| | | | | 429/206 |

FOREIGN PATENT DOCUMENTS

| JP | 2012-046386 A | | 3/2012 | |
| KR | 1020000056301 A | | 9/2000 | |
| KR | 20090124199 A | * | 12/2009 | |
| KR | 100938138 B1 | | 1/2010 | |
| KR | 20100007236 A | * | 1/2010 | |
| KR | 1020100042145 A | | 4/2010 | |
| KR | 1020100132839 A | | 12/2010 | |
| KR | 1020110116622 A | | 10/2011 | |
| WO | WO-2006109930 A1 | * | 10/2006 | ......... C01G 45/1242 |

OTHER PUBLICATIONS

Zhu et al., "Research on the electrochemical performance of nanocomposites of vanadium oxide and carbon nanotubes as cathode materials", Electrochimica Acta, 81, 2012, pp. 25-30.

Zou et al., "Template synthesis of MnO2/CNT nanocomposite and its application in rechargeable lithium batteries", Trans. Nonferrous Met Soc. China, 21, 2011, pp. 2010-2014.

* cited by examiner

COMPOSITE CATHODE ACTIVE MATERIAL, LITHIUM BATTERY INCLUDING THE SAME, AND PREPARATION METHOD THEREOF

CROSS-REFERENCE TO RELATED APPLICATIONS

This application claims priority to and the benefit of Korean Patent Application No. 10-2013-0091162, filed on Jul. 31, 2013, and all the benefits accruing therefrom under 35 U.S.C. § 119, the content of which is incorporated herein in its entirety by reference.

BACKGROUND

1. Field

The present disclosure relates to a composite cathode active material, a lithium battery including the composite cathode active material, and a method of manufacturing the composite cathode active material, and more particularly, to a composite cathode active material with improved charge/discharge rate characteristics and improved lifetime characteristics, a lithium battery including the composite cathode active material.

2. Description of the Related Art

A lithium battery, more specifically a lithium ion battery, has been used as a power source for many portable devices due to its high energy density and easiness in its design. Recently, as the lithium ion battery has been also adopted as a power source for electric vehicles or for power storage in addition to a power source for portable information technology devices, research has been intensely focused on the study of a lithium ion battery with high energy density and a long lifetime.

Among them, a method of coating a cathode surface of the lithium ion battery by using a coating material has been considered a method to greatly improve the function of the lithium ion battery by modifying a cathode active material of the lithium ion battery based on an available cathode active material.

A coating material that is used in the coating method includes an electrochemically stable oxide or a phosphate. The coating material blocks direct contact between a cathode surface and an electrolyte. As a result, the coating material prevents ion elution caused by the direct contact between a cathode surface and an electrolyte, and also the dissolution of oxygen ions in the cathode oxide, thereby improving structural stability and thermostability of the cathode active material.

However, the method of coating the cathode surface with a coating material, such as an electrochemically stable oxide or a phosphate, can cause a decrease in specific capacity due to the use of the coating material not directly involved in the charge/discharge reaction. Additionally, the coating can decrease an active reaction area, thereby increasing interfacial resistance while deteriorating high rate charge/discharge characteristics.

Furthermore, with the recent increasing demand for a high energy density cathode active material, the study on a high-voltage cathode active material is also on the increase. Accordingly, it would be desirable to develop a coating material which prevents the oxidation of an electrolyte on the surface of the high-voltage cathode active material, and also prevents the deterioration in the conductivity of the high-voltage cathode active material.

Therefore, there still remains a demand for a cathode active material with improved charge/discharge rate characteristics and improved lifetime characteristics at a high voltage, a lithium battery including the cathode active material, and a method of manufacturing the cathode active material.

SUMMARY

In an aspect, there is provided a composite cathode active material with improved charge/discharge rate characteristics and improved lifetime characteristics.

In another aspect, there is provided a lithium battery including the composite cathode active material.

In a further aspect, there is provided a method of preparing a composite cathode active material with improved charge/discharge rate characteristics and improved lifetime characteristics.

Additional aspects will be set forth in part in the description which follows and, in part, will be apparent from the description.

According to an aspect, there is provided a composite cathode active material including a composite oxide capable of intercalation and deintercalation of lithium; a carbon nanostructure; and a material which is chemically inert to lithium.

The composite cathode active material may comprise a composite oxide core capable of intercalation and deintercalation of lithium; and a shell including a carbon nanostructure and a material which is chemically inert to lithium on at least part of the composite oxide core.

According to another aspect, there is provided a lithium battery including a cathode; electrolyte; and an anode; wherein the cathode includes the composite cathode active material.

According to a further aspect, there is provided a method of manufacturing a composite cathode active material including: providing a composite oxide core capable of intercalation and deintercalation of lithium; and surface treating the composite oxide core to manufacture the composite cathode active material, wherein composite cathode active material includes a shell including a carbon nanostructure and a material which is chemically inert to lithium on at least a portion of the composite oxide core.

The composite cathode active material according to an aspect includes a composite oxide core capable of intercalation and deintercalation of lithium, a carbon nanostructure, and a material which is which is chemically inert to lithium. Accordingly, a lithium battery including the composite cathode active material can have improved charge/discharge rate characteristics and improved lifetime characteristics.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
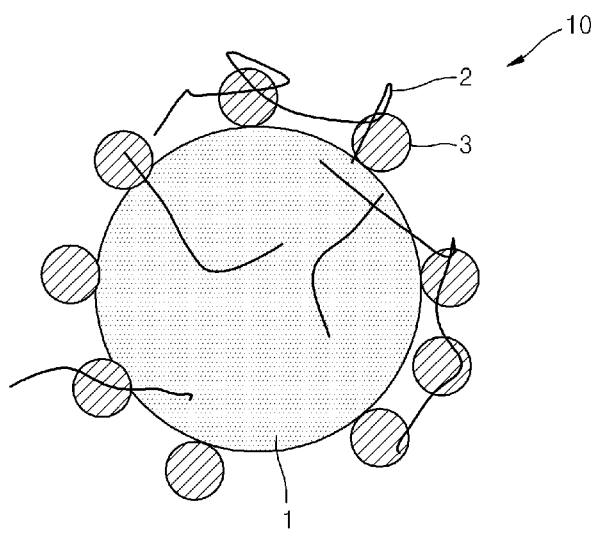
FIG. 1 is a diagram schematically illustrating an embodiment of composite cathode active material 10.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Herein a material "chemically inert to lithium" means that the material does not intercalate or deintercalate lithium under conditions present in a lithium battery.

Hereinafter, a composite cathode active material according to an exemplary embodiment, a lithium battery including the composite cathode active material, and a method of manufacturing the composite cathode active material are explained in detail. Provided herein below are exemplary embodiments and they should not limit the scope of the present disclosure.

According to an aspect, there is provided a composite cathode active material including: a composite oxide capable of intercalation/deintercalation of lithium; a carbon nanostructure; and a material which is chemically inert to lithium.

The composite cathode active material may include a composite of a carbon nanostructure and a material which is chemically inert to lithium and thus its charge/discharge rate characteristics are improved. In addition, the irreversible capacity occurring at the time of charge/discharge of a lithium battery are improved thus improving lifetime characteristics.

The composite cathode active material may include a composite oxide core capable of intercalation and deintercalation, i.e., intercalation/deintercalation, of lithium; and a shell of a carbon nanostructure and a material which is chemically inert to lithium on at least part of the composite oxide core.

FIG. 1 is a diagram illustrating a composite cathode active material 10 according to an exemplary embodiment. Referring to FIG. 1, the composite cathode active material 10 may include a shell comprising a carbon nanotube 2 and a material which is chemically inert to lithium 3 on a composite oxide core 1, which is capable of intercalation/deintercalation of lithium.

The shell may include the carbon nanostructure and the material which is chemically inert to lithium, which are present in independent phases. A portion of the carbon nanostructure may be amorphous, such as a product of melting.

A portion of the shell includes a composite of the carbon nanostructure and the material which is chemically inert to lithium.

The composite cathode active material 10 can effectively prevent direct contact between an electrolyte and the composite oxide core capable of intercalation/deintercalation of lithium. Accordingly, the composite cathode active material 10 can prevent disassociation of an electrolyte on a surface of a cathode by oxidation of the electrolyte, and also reduce the increase in interfacial resistance by charge/discharge cycles, thereby improving charge/discharge rate characteristics and lifetime characteristics.

The thickness of the shell may be from about 1 nanometer (nm) to about 10 μm. For example, the thickness of the shell may be from about 1 nm to about 500 nm. A composite cathode active material including a shell in the above range can minimize the difference in resistance between the interface of the shell and the interface of the composite oxide core which is capable of intercalation/deintercalation of lithium.

The composite oxide core capable of intercalation/deintercalation of lithium may have a layered structure or a spinel structure. The composite oxide capable of intercalation/deintercalation of lithium may include an over-lithiated layered oxide, a lithium manganese oxide, a lithium nickel manganese oxide, a lithium nickel cobalt manganese oxide, a lithium manganese oxide doped with a nonmetal element, a lithium nickel manganese oxide doped with a nonmetal element, a lithium nickel cobalt manganese oxide doped with a nonmetal element, and a combination thereof.

For example, the composite oxide core capable of intercalation/deintercalation of lithium may comprise a lithium transition metal oxide represented by Formulas 1 to 4.

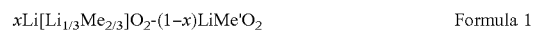

Formula 1

In Formula 1, x is $0<x\leq 0.8$;
Me is Mn, Mo, W, V, Ti, Zr, Ru, Rh, Pd, Os, Ir, Pt, or a combination thereof; and Me' is Ni, Mn, Co, or a combination thereof.

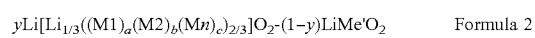

Formula 2

In Formula 2,
a is $0\leq a\leq \frac{1}{3}$, b is $0\leq b\leq \frac{1}{3}$, and a+b+c=1;
y is $0<y\leq 0.8$;
M1 is Ni, Cu, Zn, Co, Cr, Fe, Mg, or a combination thereof; and M2 is Mo, W, V, Ti, Zr, Ru, Rh, Pd, Os, Ir, Pt, or a combination thereof.

Formula 3

In Formula 3,
D is $0.9\leq d\leq 1.6$, e is $0\leq e\leq 1$, g is $0\leq g\leq 0.6$, j is $0\leq j\leq 1$;
M3 is Mn, Ni, Co, Cu, Mg, Na, Ca, Ti, Zn, Ga, Ge, Al, Cr, Sr, Mo, W, V, Zr, Ru, Rh, Pd, Os, Ir, Ag, Au, Hf, Sn, Pt, or a combination thereof; and X1 is O, F, S P, or a combination thereof.

$$Li_pMn_{2-q}(M4)_qO_{4-t}(X2)_t \quad \text{Formula 4}$$

In Formula 4, p is 0.9≤q≤1.6, q is 0≤q≤1, t is 0≤t≤1;

M4 is Mn, Ni, Co, Cu, Mg, Na, Ca, Ti, Zn, Ga, Ge, Al, Cr, Mg, Sr, Mo, W, V, Ti, Zr, Ru, Rh, Pd, Os, Ir, Ag, Au, Hf, Sn, Pt, or a combination thereof; and X2 is O, F, S, P, or a combination thereof.

The lithium transition metal oxides represented by Formulas 1-4 are high-capacity cathode active materials containing a large amount of lithium. However, these high-capacity cathode active materials are charged/discharged under high voltage conditions and thus electrolytes can be easily dissociated on the surface of the cathode. Accordingly, transition metals such as Mn contained in the lithium transition metal oxide may be easily dissolved in the electrolyte and ions may be eluted out. Furthermore, the lithium transition metal oxide can self-discharge when stored at a high temperature, and the lithium transition metal oxide capacity may be reduced during charge/discharge at a high temperature.

Accordingly, by including a carbon nanostructure and a material which is chemically inert to lithium on at least a portion of the lithium transition metal oxide core, the dissociation between the core and the electrolyte can be prevented even at a high voltage and/or a high temperature, thereby improving charge/discharge rate characteristics and lifetime characteristics.

The carbon nanostructure may be carbon nanocone, carbon nanohorn, carbon nanotube ("CNT"), or a combination thereof.

For example, the carbon nanostructure may include a single-walled carbon nanotube, a multi-walled carbon nanotube, or a combination thereof. For example, the average aspect ratio of the carbon nanotube may be equal to or less than about 300, for example, equal to or less than about 250.

The expression "average aspect ratio" used herein, refers to "average length/average diameter ratio", wherein "average diameter" refers to an average value of the diameter of the thickest portion of at least 10 carbon nanotubes measured by using an SEM at a magnification of 150,000, and "average length" refers to an average value of the length of at least 10 carbon nanotubes measured by using an SEM at a magnification of 150,000.

The carbon nanotube may have an average diameter of, for example, from about 1 nm to about 50 nm, and for example, from about 2 nm to about 50 nm. The carbon nanotube having an average diameter within the range may have an improvement in electric conductivity by distributing them uniformly on a composite oxide core, which is capable of intercalation/deintercalation of lithium, thereby improving charge/discharge rate characteristics.

The material which is chemically inert to lithium is an inorganic material including a metal oxide, a metal fluoride, or a combination thereof.

For example, the material which is chemically inert to lithium may comprise an inorganic material represented by Formula 5, Formula 6, or a combination thereof.

$$(M5)O_x \quad \text{Formula 5}$$

wherein, in Formula 5, M5 is a metal selected from Al, V, Nb, Mo, W, Mn, Cr, Zr, Si, Mg, Ca, Y, Ba, B, Ta, In, Ag, Ti, Fe, Co, Ni, Cu, Zn, Sn, La, or a combination thereof, and x is 0<x≤6; and $$(M6)F_y \quad \text{Formula 6}$$

wherein, in Formula 6, M6 is a metal selected from Al, V, Nb, Mo, W, Mn, Cr, Zr, Si, Mg, Ca, Y, Ba, B, Ta, In, Ag, Ti, Fe, Co, Ni, Cu, Zn, Sn, La, or a combination thereof, and y is 0<y≤6.

For example, the inorganic material may comprise $Al_2O_3$, $AlF_3$, or a combination thereof. The inorganic material, being a metal oxide or a metal fluoride with excellent electric stability, can improve discharge potential by improving the mobility of lithium ions, thereby improving its lifetime characteristics.

The material which is chemically inert to lithium may have an average particle size from about 1 nm to about 900 nm. For example, the material which is chemically inert to lithium may have an average diameter from about 1 nm to about 99.99 nm. The material which is chemically inert to lithium and having an average diameter within the range can have a specific surface area sufficient for the progress of diffusion of lithium ions during charge/discharge of a lithium battery, thus capable of improving lifetime characteristics.

The contents of the carbon nanostructure and the material which is chemically inert to lithium may be from about 0.001 parts by weight to about 10 parts by weight, based on 100 parts by weight of a composite oxide capable of intercalation/deintercalation of lithium. For example, the content of the carbon nanostructure and the material which is chemically inert to lithium may each independently be from about 0.001 parts by weight to about 5 parts by weight, based on 100 parts by weight of the composite oxide core capable of intercalation/deintercalation of lithium. When the content of the carbon nanostructure and the material which is chemically inert to lithium are within the above range, the composite cathode active material can have excellent charge/discharge rate characteristics and lifetime characteristics even at high temperature conditions.

The weight ratio between the carbon nanostructure and the material which is chemically inert to lithium may be from about 1:1 to about 10:1. For example, the weight ratio between the carbon nanostructure and the material which is chemically inert to lithium may be from about 1:1 to about 5:1. When the weight ratio between the carbon nanostructure and the material which is chemically inert to lithium is within the above range, the composite cathode active material can have improved charge/discharge rate characteristics due to the improvement in electric conductivity, and also lifetime characteristics can be improved due to electrochemical stabilization of the composite cathode active material.

In another aspect, the lithium battery may include a cathode; electrolyte; and an anode; wherein the cathode may include the composite cathode active material. The lithium battery can be manufactured as follows:

First, a composite cathode active material composition may be provided, or prepared by combining, e.g., mixing, a composite cathode active material including a composite oxide core capable of intercalation/deintercalation of lithium, a carbon nanostructure, and a material which is chemically inert to lithium; a conductive material; a binder; and a solvent. Then, the composite cathode active material composition may be directly coated on an aluminum current collector and dried to prepare a cathode comprising a layer comprising the composite cathode active material. Alternatively, a cathode, on which the composite cathode active material layer is formed, may be prepared by casting the composite cathode active material composition on a separate support, and laminating a film obtained from the support by exfoliation on an aluminum current collector.

The amount of the composite oxide core capable of intercalation/deintercalation of lithium, the carbon nanostructure, the contents of the material which is chemically inert to lithium and the carbon nanostructure, and the material which is chemically inert to lithium, and the weight ratio between the carbon nanostructure and the material which is chemically inert to lithium are the same as described above and are thus abbreviated herein below.

The operation voltage of the composite cathode active material may be equal to or greater than 4.3 Volts versus lithium (V), specifically 4.3 V±0.1 V. For example, the operational voltage of the composite cathode active material may be from about 4.3 V to about 5.5 V, and may be a high-voltage composite cathode active material.

Examples of the conductive material include a carbon fiber such as carbon black, graphite granules, natural graphite, artificial graphite, acetylene black, or Ketjen black; carbon nanotube, a metal powder, or metal fiber or metal tube such as copper, nickel, aluminum, or silver; or a conductive polymer such as a polyphenylene derivative, but are not limited thereto. A combination comprising at least one of the foregoing may be used. Any suitable conductive material used in the art may be used.

Examples of the binder include vinylidene fluoride/hexafluoropropylene copolymer, polyvinylidene fluoride, polyacrylonitrile, polymethyl methacrylate ("PMMA"), polytetrafluoroethylene ("PTFE"), or a combination thereof, or styrene-butadiene rubber-based polymer. N-methylpyrrolidone ("NMP"), acetone, water, or a combination thereof may be used as a solvent, but are not limited thereto. Any suitable binder and solvent used in the art may be used. The amounts of the composite cathode active material, the conductive material, the binder and the solvent are similar to those generally used in the art of lithium batteries.

The cathode may further include an additional cathode active material in addition to the composite cathode active material described above. Any additional cathode active material may be used in the art as long as it is capable of intercalation/deintercalation of lithium.

The anode may be prepared in the same manner as the cathode except that an anode active material is used instead of the composite cathode active material and/or the cathode active material.

For example, the anode may be prepared as follows: As in the case of preparing the cathode, an anode active material composition can be prepared by mixing an anode active material, a conductive material, a binder, and a solvent, and then directly coating the anode active material composition on a copper current collector to prepare an anode electrode. Alternatively, an anode electrode, on which the anode active material layer is formed, may be prepared by casting the anode active material composition on a separate support, and laminating a film obtained from the support by exfoliation on a copper current collector.

Examples of the anode active materials include lithium, a metal material alloyable with lithium, a transition metal oxide, a lithium-dopable/dedopable material, or a material capable of reversible intercalation/deintercalation of lithium ions.

Examples of the transition metal oxide include vanadium oxide, or lithium vanadium oxide. Examples of the lithium-dopable/dedopable material include Si, $SiO_x$ (0<x<2), Si—X alloy (wherein X refers to an alkali metal, an alkali earth metal, a Group XIII-XVI element, a transition metal, a rare earth element, or a combination thereof but not Si), Sn, $SnO_2$, Sn—Y alloy (wherein X refers to an alkali metal, an alkali earth metal, a Group XIII-XVI element, a transition metal, a rare earth element, or a combination thereof but not Sn), and at least one of them may be used along with $SiO_2$. X may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

Examples of the material capable of reversible intercalation/deintercalation of lithium ions are any carbon materials which are used as a carbon-based anode active material in the lithium secondary battery, for example, crystalline carbon, amorphous carbon, or both may be used together. Examples of the crystalline carbon include an amorphous, a sheet-typed, a flaky, a spherical, or a fibrous form of natural or artificial graphite. Examples of the amorphous carbon include soft carbon (relatively low-temperature calcined carbon) or hard carbon, mesophase pitch carbide, calcined cokes, etc.

However, the anode active material is not limited thereto, and any suitable anode active material capable of intercalation/deintercalation of lithium can be used.

In an anode active material composition, a conductive material, a binder and a solvent may be the same as in the cathode active material composition. In some cases, a plasticizer may be added to the cathode active material composition and the anode active material composition to thereby form apertures inside an anode electrode plate.

The amount of the anode active material, the conductive material, the binder, and the solvent are similar to those used in the art of lithium batteries. Depending on the use and features of the lithium battery, at least one of the conductive material, the binder, and the solvent may be omitted.

Then, a separator to be disposed between the cathode and the anode is provided or prepared. The separator used in the present disclosure may be any suitable separator used in the art of lithium batteries. A separator with low resistance against ionic movement of electrolytes and an excellent electrolyte-moisturizing capacity may be used. For example, the separator may be selected from glass fiber, polyester, Teflon, polyethylene, polypropylene, polytetrafluoroethylene ("PTFE"), or a combination thereof, and may be in the form of a woven or a non-woven fabric. For example, the separator used in a lithium battery may be windable separator made of such as polyethylene or polypropylene, whereas the separator used in lithium ion batteries may be one which has excellent wetting capacity of an organic electrolyte. For example, the separator may be prepared according to the method described herein below.

A separator composition may be prepared by mixing a polymer resin, a filler, and a solvent. The separator composition may be directly coated on the upper portion of an electrode and dried to form a separator. Alternatively, the separator composition may be cast on a support and dried, and a separator film exfoliated from the support may be laminated on the upper portion of the electrode to form a separator.

The polymer resin to be used in the manufacture of a separator is not particularly limited, and any material used as a binder of an electrode plate may be used. For example, vinylidene fluoride/hexafluoropropylene copolymer, polyvinylidene fluoride ("PVDF"), polyacrylonitrile, polymethylmethacrylate, or a combination thereof may be used.

Then, an electrolyte may be prepared.

For example, the electrolytes may be an organic electrolyte. In addition, the electrolyte may be in a solid form, for example, boron oxide, or lithium oxynitride, but are not limited thereto, and any suitable electrolyte which can be used as solid electrolytes in the art can be used. The solid electrolyte may be formed at the anode by a method such as sputtering.

For example, an organic electrolyte may be prepared. The organic electrolyte may be prepared by dissolving a lithium salt in an organic solvent.

The organic solvent to be used may be any suitable organic solvent used in the art, for example, propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethyl sulfoxide, dioxane, 1,2-dimethoxyethane, sulforane, dichloroethane, chlorobenzene, nitrobenzene, diethylene glycol, dimethyl ether, or a combination thereof.

The lithium salt to be used may be any suitable lithium salt used in the art, for example, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, LiI, or a combination thereof.

Figure 3:
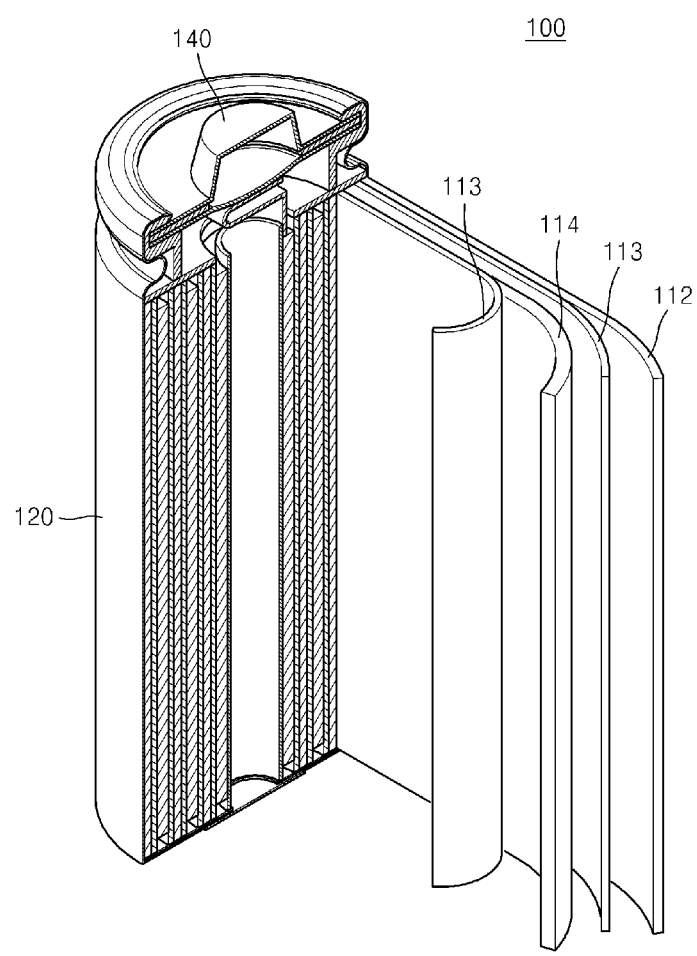
FIG. 3 is an exploded perspective view of an embodiment of a lithium battery.

As shown in FIG. 3, a lithium battery 100 includes a cathode 114, an anode 112, and a separator 113. The cathode 114, the anode 112, and the separator 113 are wound or folded to be received into a battery container 120. Then, organic electrolyte is introduced into the battery container 120, and sealed with a sealing element 140 thereby completing a manufacture of a lithium battery 100. The battery container 120 may be cylindrical, square-shaped, or thin film-shaped. For example, the lithium battery 100 may be a large thin film battery. The lithium battery 100 may be a lithium ion battery.

A separator may be disposed between a cathode and an anode to thereby form an electrode assembly. Once the electrode assembly is laminated in a bicell structure, an organic electrolyte may be impregnated thereinto, and the resulting product put into a pouch and sealed to thereby complete a lithium ion polymer battery.

Furthermore, a plurality of electrode assemblies may be laminated to form a battery pack, and thus the formed battery pack can be used in all devices requiring high capacity and high output, for example, notebooks, smartphones, and electric vehicles.

In addition, the lithium battery has excellent storage stability at a high temperature, superior lifetime characteristics, and a high rate capability and thus can be used in electric vehicles. For example, it can be used in hybrid vehicles such as a plug-in hybrid electric vehicle ("PHEV").

The composite cathode active material may be prepared by a method comprising: providing a composite oxide core capable of intercalation and deintercalation of lithium; and surface treating the composite oxide core to manufacture the composite cathode active material, wherein the composite cathode active material comprises a shell comprising a carbon nanostructure and a material which is chemically inert to lithium on at least a portion of the composite oxide core.

In another aspect, there is provided a method of manufacturing a composite cathode active material including: providing a composite oxide core capable of intercalation/deintercalation of lithium; and surface treating the composite oxide core to manufacture the composite cathode active material, wherein the composite cathode active material comprises a shell comprising a carbon nanostructure and a material which is chemically inert to lithium on at least a portion of the composite oxide core. The shell may be provided through a surface treatment in a dry or a wet process.

First, a composite oxide core capable of intercalation/deintercalation of lithium is prepared. The composite oxide core capable of intercalation/deintercalation of lithium is further described above and duplicative description is omitted below.

The composite oxide core may be prepared, for example, as follows:

A co-precipitation compound may be prepared by co-precipitating an aqueous solution of a metal salt and an alkaline solution.

The aqueous solution of a metal salt may include Mn, Ni, Co, or a combination thereof; or Mn, Ni, Co, or a combination thereof, and optionally Mo, W, V, Ti, Zr, Ru, Rh, Pd, Os, Ir, Pt, Cu, Zn, Cr, Fe, Mg, Na, Ca, Ga, Ge, Al, Cr, Sr, Ag, Au, Hf, Sn, or a combination thereof. For example, the aqueous solution of a metal salt may include Mn, Ni, Co, or a combination thereof.

The aqueous solution of a metal salt may include an aqueous solution of a sulfate, a nitrate, an acetate, a halide, a hydrate, or a combination thereof. However, the aqueous solution of a metal salt may not be limited thereto, and any suitable water soluble salt that can be used.

The alkaline solution may include an aqueous solution of $Na_2CO_3$, NaOH, KOH, $NH_4OH$, or a combination thereof.

The co-precipitation compound may be prepared at from about pH 8 to about pH 10, for example, at from about pH 8 to about pH 9. When the co-precipitation compound is selected to be within the above pH range, a co-precipitation compound with high density can be obtained.

Then, the co-precipitation compound may be combined, e.g., mixed, with a lithium salt and a composite oxide core capable of intercalation/deintercalation of lithium.

The lithium salt may include $Li_2CO_3$, $LiNO_3$, LiBr, LiCl, LiI, LiOH, $Li(CH_3CO_2)$, $LiH_2PO_4$, $LiOH.H_2O$, $Li(CH_3CO_2).2H_2O$, or a combination thereof.

Subsequently, a composite cathode active material which includes a shell comprising, e.g., consisting of, a carbon nanostructure and a material which is chemically inert to lithium on at least a portion of the composite oxide core is prepared through a surface treatment in a dry or a wet process. The carbon nanostructure, the material which is chemically inert to lithium, and the shell are further described above and duplicative description is therefore omitted.

The surface treatment in the dry process may be performed by ball milling, hybridization, or mechanofusion. Examples of the ball mill may include a planetary ball mill, a low speed ball mill (operating at 500 to 2000 RPM), or a high speed ball mill, e.g., a KADY mill operating at about 2000 to 10,000 RPM.

For example, the surface treatment in the dry process may employ a mechanofusion method. The mechanofusion method includes putting a mixture into a rotating container, fixing the mixture to an inner wall of the container by centrifugal force, and compressing the mixture by a gap generated between the inner wall of the container and the arm head which approaches thereto with a small interval. By controlling the contents of the carbon nanostructure and the material which is chemically inert to lithium; the weight ratio between the carbon nanostructure and the material which is chemically inert to lithium; and also by controlling factors such as the number of rotations, and the size of the reactor, a composite cathode active material including a shell of the carbon nanostructure and the material which is chemically inert to lithium can be prepared on at least part of the composite oxide core capable of intercalation/deintercalation of lithium.

The surface treatment in the dry process does not require an additional step of heat treatment. However, if desired, heat treatment may be additionally performed upon after the shell is formed. The heat treatment process enhances the adhesion between the composite oxide core capable of intercalation/deintercalation of lithium, the carbon nanostructure, and the material which is chemically inert to lithium, and also removes impurities, thereby forming a solid shell including the carbon nanostructure and the material which is chemically inert to lithium on the composite oxide core.

The surface treatment in the wet process may be performed by spray, co-precipitation, or dipping. For example, a dipping method may be used.

The dipping method prepares a dispersion liquid where a powder of a carbon nanostructure and a material which is chemically inert to lithium are dispersed in acetone, or an organic solvent of alcohol such as ethanol or methanol. Then, a composite oxide core capable of intercalation/deintercalation of lithium is dipped into the dispersion liquid, and heat treated at from about 80° C. to about 150° C.

Hereinafter, the present disclosure is further illustrated by the following examples and comparative examples. However, it shall be understood that these examples are only used to specifically set forth the present disclosure, and they are not limitative in any form. Furthermore, those not described here are considered to be fully inferred by a skilled person in the art, and thus the explanations are omitted herein below.

EXAMPLES

Preparation of Composite Cathode Active Material

Example 1: Preparation of Composite Cathode Active Material

A 2 molar (M) aqueous solution of nickel sulfate ($NiSO_4 \cdot 6(H_2O)$, available from Aldrich), a 2 M aqueous solution of cobalt sulfate ($CoSO_4 \cdot 7(H_2O)$, available from Aldrich), and a 2 M aqueous solution of manganese sulfate ($MnSO_4 \cdot x(H_2O)$, available from Aldrich) were prepared. Then, the aqueous nickel sulfate solution, the aqueous cobalt sulfate solution, and the aqueous manganese sulfate solution were mixed so that the molar ratio of nickel, cobalt, and manganese respectively contained in the aqueous nickel sulfate solution, the aqueous cobalt sulfate solution, and the aqueous manganese sulfate solution became 0.17:0.1:0.56. The mixed solution was added into 4 liters (L) of a 0.2 M $NH_4OH$ solution along with a 2 M $Na_2CO_3$ solution at a rate of 3 milliliters per minute (mL/min) for 10 hours while maintaining the pH of the mixed solution at pH 8, and the resulting precipitant was filtrated. The precipitant was washed with water, dried, and mixed with $Li_2CO_3$ (available from Aldrich) so that the molar ratio of Li:Ni:Co:Mn became 1.18:0.17:0.1:0.56. The resultant was heat treated for 5 hours at 950° C. in an air atmosphere to obtain a lithium transition metal oxide ($Li_{1.18}Ni_{0.17}Co_{0.1}Mn_{0.56}O_2$) core with a layered structure.

Then, 100 parts by weight of the lithium transition metal oxide ($Li_{1.18}Ni_{0.17}Co_{0.1}Mn_{0.56}O_2$), 1.3 parts by weight of single-walled carbon nanotubes (available from ENANOTEC, purity: ≥90%, average diameter: 2 nm, average length: 30 μm), and 0.2 part by weight of $Al_2O_3$ were mixed and pulverized at 3000 RPM for 30 minutes via a dry process using a Nobilta NOB-MINI (available from Hosokawa), thereby obtaining a composite cathode active material, including a shell of 500 nm thick single-walled carbon nanotubes and $Al_2O_3$ on the lithium transition metal oxide ($Li_{1.18}Ni_{0.17}Co_{0.1}Mn_{0.56}O_2$) core.

Example 2: Preparation of Composite Cathode Active Material

A composite cathode active material was obtained in the same manner as in Example 1 except that 100 parts by weight of lithium transition metal oxide ($Li_{1.18}Ni_{0.17}Co_{0.1}Mn_{0.56}O_2$), 1.3 parts by weight of single-walled carbon nanotubes (available from ENANOTEC, purity: ≥90%, average diameter: 2 nm, average length: 30 μm), and 0.5 parts by weight of $Al_2O_3$ were mixed and pulverized at 3000 RPM for 30 minutes via a dry process using a Nobilta NOB-MINI (available from Hosokawa), instead of mixing 100 parts by weight of lithium transition metal oxide ($Li_{1.18}Ni_{0.17}Co_{0.1}Mn_{0.56}O_2$), 1.3 parts by weight of single-walled carbon nanotubes (available from ENANOTEC, purity: ≥90%, average diameter: 2 nm, average length: 30 μm), and 0.2 part by weight of $Al_2O_3$, and pulverizing at 3000 RPM for 30 minutes via a dry process using a Nobilta NOB-MINI (available from Hosokawa), thereby obtaining a composite cathode active material including a shell of 500 nm thick single-walled carbon nanotubes and $Al_2O_3$ on the lithium transition metal oxide ($Li_{1.18}Ni_{0.17}Co_{0.1}Mn_{0.56}O_2$) core.

Example 3: Preparation of Composite Cathode Active Material

A composite cathode active material was obtained in the same manner as in Example 1 except that 100 parts by weight of lithium transition metal oxide ($Li_{1.18}Ni_{0.17}Co_{0.1}Mn_{0.56}O_2$), 1.3 parts by weight of single-walled carbon nanotubes (available from ENANOTEC, purity: ≥90%, average diameter: 2 nm, average length: 30 μm) and 1 part by weight of $Al_2O_3$ were mixed and pulverized at 3000 RPM for 30 minutes via a dry process using a Nobilta NOB-MINI (Hosokawa), instead of mixing 100 parts by weight of lithium transition metal oxide ($Li_{1.18}Ni_{0.17}Co_{0.1}Mn_{0.56}O_2$), 1.3 parts by weight of single-walled carbon nanotubes (available from ENANOTEC, purity: ≥90%, average diameter: 2 nm, average length: 30 μm), and 0.2 part by weight of $Al_2O_3$, and pulverizing at 3000 RPM for 30 minutes via a dry process using a Nobilta NOB-MINI (available from Hosokawa), thereby obtaining a composite cathode active material including a shell of 500 nm thick single-walled carbon nanotubes and $Al_2O_3$ on the lithium transition metal oxide ($Li_{1.18}Ni_{0.17}Co_{0.1}Mn_{0.56}O_2$) core.

Example 4: Preparation of Composite Cathode Active Material

A composite cathode active material was obtained in the same manner as in Example 1 except that 100 parts by weight of lithium transition metal oxide ($Li_{1.18}Ni_{0.17}Co_{0.1}Mn_{0.56}O_2$), 1.3 parts by weight of single-walled carbon nanotubes (available from ENANOTEC, purity: ≥90%, average diameter: 2 nm, average length: 30

μm), and 1.7 parts by weight of $Al_2O_3$ were mixed and pulverized at 3000 RPM for 30 minutes via a dry process using a Nobilta NOB-MINI (available from Hosokawa), instead of mixing 100 parts by weight of lithium transition metal oxide ($Li_{1.18}Ni_{0.17}Co_{0.1}Mn_{0.56}O_2$), 1.3 parts by weight of single-walled carbon nanotubes (ENANOTEC, purity: ≥90%, average diameter: 2 nm, average length: 30 μm), and 0.2 part by weight of $Al_2O_3$, and pulverizing at 3000 RPM for 30 minutes via a dry process using a Nobilta NOB-MINI (available from Hosokawa), thereby obtaining a composite cathode active material including a shell of 500 nm thick single-walled carbon nanotubes and $Al_2O_3$ on the lithium transition metal oxide ($Li_{1.18}Ni_{0.17}Co_{0.1}Mn_{0.56}O_2$) core.

Example 5: Preparation of Composite Cathode Active Material

A composite cathode active material was obtained in the same manner as in Example 1 except that 100 parts by weight of lithium transition metal oxide ($Li_{1.18}Ni_{0.17}Co_{0.1}Mn_{0.56}O_2$), 1.0 part by weight of single-walled carbon nanotubes (available from ENANOTEC, purity: ≥90%, average diameter: 2 nm, average length: 30 μm), and 0.2 parts by weight of $Al_2O_3$ were mixed and pulverized at 3000 RPM for 30 minutes via a dry process using a Nobilta NOB-MINI (available from Hosokawa), instead of mixing 100 parts by weight of lithium transition metal oxide ($Li_{1.18}Ni_{0.17}Co_{0.1}Mn_{0.56}O_2$), 1.3 parts by weight of single-walled carbon nanotubes (available from ENANOTEC, purity: ≥90%, average diameter: 2 nm, average length: 30 μm), and 0.2 part by weight of $Al_2O_3$, and pulverizing at 3000 RPM for 30 minutes via a dry process using a Nobilta NOB-MINI (available from Hosokawa), thereby obtaining a composite cathode active material including a shell of 500 nm thick single-walled carbon nanotubes and $Al_2O_3$ on the lithium transition metal oxide ($Li_{1.18}Ni_{0.17}Co_{0.1}Mn_{0.56}O_2$) core.

Example 6: Preparation of Composite Cathode Active Material

A composite cathode active material was obtained in the same manner as in Example 1 except that 100 parts by weight of lithium transition metal oxide ($Li_{1.18}Ni_{0.17}Co_{0.1}Mn_{0.56}O_2$), 1.0 part by weight of multi-walled carbon nanotubes (available from ENANOTEC, purity: ≥95%, average diameter: 20 nm, average length: 25 μm), and 0.5 parts by weight of $Al_2O_3$ were mixed and pulverized at 3000 RPM for 30 minutes via a dry process using a Nobilta NOB-MINI (available from Hosokawa), instead of mixing 100 parts by weight of lithium transition metal oxide ($Li_{1.18}Ni_{0.17}Co_{0.1}Mn_{0.56}O_2$), 1.3 parts by weight of single-walled carbon nanotubes (available from ENANOTEC, purity: ≥90%, average diameter: 2 nm, average length: 30 μm), and 0.2 part by weight of $Al_2O_3$, and pulverizing at 3000 RPM for 30 minutes via a dry process by using a Nobilta NOB-MINI (available from Hosokawa), thereby obtaining a composite cathode active material including a shell of 500 nm thick multi-walled carbon nanotubes and $Al_2O_3$ on the lithium transition metal oxide ($Li_{1.18}Ni_{0.17}Co_{0.1}Mn_{0.56}O_2$) core.

Example 7: Preparation of Composite Cathode Active Material

A 2 M aqueous solution of nickel sulfate ($NiSO_4.6(H_2O)$, available from Aldrich), a 2 M aqueous solution of cobalt sulfate ($CoSO_4.7(H_2O)$, available from Aldrich), and a 2 M aqueous solution of manganese sulfate ($MnSO_4.x(H_2O)$, available from Aldrich) were prepared. Then, the aqueous nickel sulfate solution, the aqueous cobalt sulfate solution, and the aqueous manganese sulfate solution were mixed so that the molar ratio of the nickel, cobalt, and manganese respectively contained in the aqueous nickel sulfate solution, the aqueous cobalt sulfate solution, and the aqueous manganese sulfate solution became 0.142:0.142:0.522. The mixed solution was added into 4 L of a 0.2 M $NH_4OH$ solution along with a 2 M $Na_2CO_3$ solution at a rate of 3 mL/min for 10 hours while maintaining the pH of the mixed solution at pH 8, and the resulting precipitate was filtrated. The precipitate was washed with water, dried, and mixed with $Li_2CO_3$ (available from Aldrich) so that the molar ratio of Li:Ni:Co:Mn became 1.19:0.142:0.142:0.522. The resultant was heat treated for 5 hours at 950° C. in an air atmosphere to obtain a lithium transition metal oxide ($Li_{1.19}Ni_{0.142}Co_{0.142}Mn_{0.522}O_2$) core with a layered structure.

Then, 100 parts by weight of lithium transition metal oxide ($Li_{1.19}Ni_{0.142}Co_{0.142}Mn_{0.522}O_2$), 1 part by weight of single-walled carbon nanotubes (available from ENANOTEC, purity: ≥90%, average diameter: 2 nm, average length: 30 μm), and 0.5 parts by weight of $AlF_3$ were mixed and pulverized at 3000 RPM for 30 minutes via a dry process using a Nobilta NOB-MINI (available from Hosokawa), thereby obtaining a composite cathode active material including a shell of 500 nm thick single-walled carbon nanotubes and $AlF_3$ on the lithium transition metal oxide ($Li_{1.19}Ni_{0.142}Co_{0.142}Mn_{0.522}O_2$) core.

Example 8: Preparation of Composite Cathode Active Material

A 2 M aqueous solution of nickel sulfate ($NiSO_4.6(H_2O)$, available from Aldrich), a 2 M aqueous solution of cobalt sulfate ($CoSO_4.7(H_2O)$, available from Aldrich), and a 2 M aqueous solution of manganese sulfate ($MnSO_4.x(H_2O)$, available from Aldrich) were prepared. Then, the aqueous nickel sulfate solution, the aqueous cobalt sulfate solution, and the aqueous manganese sulfate solution were mixed so that the molar ratio of the content of nickel, cobalt, and manganese respectively contained in the aqueous nickel sulfate solution, the aqueous cobalt sulfate solution, and the aqueous manganese sulfate solution became 0.142:0.142:0.522. The mixed solution was added into 4 L of a 0.2 M $NH_4OH$ solution along with a 2 M $Na_2CO_3$ solution at a rate of 3 mL/min for 10 hours while maintaining the pH of the mixed solution at pH 8, and the resulting precipitate was filtrated. The precipitate was washed with water, dried, and mixed with $Li_2CO_3$ (available from Aldrich) so that the molar ratio of Li:Ni:Co:Mn became 1.19:0.142:0.142:0.522. The resultant was heat treated for 5 hours at 950° C. in an air atmosphere to obtain a lithium transition metal oxide ($Li_{1.19}Ni_{0.142}Co_{0.142}Mn_{0.522}O_2$) core with a layered structure.

Then, a composite cathode active material was obtained in the same manner as in Example 1 except that 100 parts by weight of lithium transition metal oxide ($Li_{1.19}Ni_{0.142}Co_{0.142}Mn_{0.522}O_2$), 1 part by weight of single-walled carbon nanotubes (ENANOTEC, purity: ≥90%, average diameter: 2 nm, average length: 30 μm) and 1 part by weight of $AlF_3$ were mixed and pulverized at 3000 RPM for 30 minutes via a dry process by using a Nobilta NOB-MINI (Hosokawa), thereby obtaining a composite cathode active material including a shell consisting of 500 nm thick single-walled carbon nanotubes and AlF$_3$ on the lithium transition metal oxide (Li$_{1.19}$Ni$_{0.142}$Co$_{0.142}$Mn$_{0.522}$O$_2$) core.

Example 9: Preparation of Composite Cathode Active Material

A 2 M aqueous solution of nickel sulfate (NiSO$_4$.6(H$_2$O), available from Aldrich), a 2 M aqueous solution of cobalt sulfate (CoSO$_4$.7(H$_2$O), available from Aldrich), and a 2 M aqueous solution of manganese sulfate (MnSO$_4$.x(H$_2$O), available from Aldrich) were prepared. Then, the aqueous nickel sulfate solution, the aqueous cobalt sulfate solution, and the aqueous manganese sulfate solution were mixed so that the molar ratio of the content of nickel, cobalt, and manganese respectively contained in the aqueous nickel sulfate solution, the aqueous cobalt sulfate solution, and the aqueous manganese sulfate solution became 0.142:0.142: 0.522. The mixed solution was added into 4 L of a 0.2 M NH$_4$OH solution along with a 2 M Na$_2$CO$_3$ solution at a rate of 3 mL/min for 10 hours while maintaining the pH of the mixed solution at pH 8, and the resulting precipitant was filtrated. The precipitant was washed with water, dried, and mixed with Li$_2$CO$_3$ (available from Aldrich) so that the molar ratio of Li:Ni:Co:Mn became 1.19:0.142:0.142:0.522. The resultant was heat treated for 5 hours at 950° C. in an air atmosphere to obtain a lithium transition metal oxide (Li$_{1.19}$Ni$_{0.142}$Co$_{0.142}$Mn$_{0.522}$O$_2$) core with a layered structure.

Then, 100 parts by weight of lithium transition metal oxide (Li$_{1.19}$Ni$_{0.142}$Co$_{0.142}$Mn$_{0.522}$O$_2$), 1 part by weight of single-walled carbon nanotubes (available from ENANOTEC, purity: ≥90%, average diameter: 2 nm, average length: 30 μm) and 2.0 parts by weight of AlF$_3$ were mixed and pulverized at 3000 RPM for 30 minutes via a dry process by using a Nobilta NOB-MINI (available from Hosokawa), thereby obtaining a composite cathode active material including a shell of 500 nm thick single-walled carbon nanotubes and AlF$_3$ on the lithium transition metal oxide (Li$_{1.19}$Ni$_{0.142}$Co$_{0.142}$Mn$_{0.522}$O$_2$) core.

Example 10: Preparation of Composite Cathode Active Material

A 2 M aqueous solution of nickel sulfate (NiSO$_4$.6(H$_2$O), available from Aldrich), a 2 M aqueous solution of cobalt sulfate (CoSO$_4$.7(H$_2$O), available from Aldrich), and a 2 M aqueous solution of manganese sulfate (MnSO$_4$.x(H$_2$O), available from Aldrich) were prepared. Then, the aqueous nickel sulfate solution, the aqueous cobalt sulfate solution, and the aqueous manganese sulfate solution were mixed so that the molar ratio of the content of nickel, cobalt, and manganese respectively contained in the aqueous nickel sulfate solution, the aqueous cobalt sulfate solution, and the aqueous manganese sulfate solution became 0.17:0.1:0.56. The mixed solution was added into 4 L of a 0.2 M NH$_4$OH solution along with a 2 M Na$_2$CO$_3$ solution at a rate of 3 mL/min for 10 hours while maintaining the pH of the mixed solution at pH 8, and the resulting precipitant was filtrated. The precipitant was washed with water, dried, and mixed with Li$_2$CO$_3$ (available from Aldrich) so that the molar ratio of Li:Ni:Co:Mn became 1.18:0.17:0.1:0.56. The resultant was heat treated for 5 hours at 950° C. in an air atmosphere to obtain a lithium transition metal oxide (Li$_{1.18}$Ni$_{0.17}$Co$_{0.1}$Mn$_{0.56}$O$_2$) core with a layered structure.

Then, 5 g of the lithium transition metal oxide core was dispersed in 50 mL of a 0.05M ammonium hydroxide solution. The dispersion was added 0.625 g of AlNO$_3$.9H$_2$O to precipitate aluminum hydroxide, heat treated at 300° C. in an air atmosphere and a shell of Al$_2$O$_3$ was formed on the lithium transition metal core.

Subsequently, a dispersion, in which 0.1 g of multi-walled carbon nanotubes powder (available from ENANOTEC, average length: 400 nm) was dispersed in 300 mL of acetone, was prepared. The dispersion was dispersed with a core, on which a shell of Al$_2$O$_3$ is formed, dried at 120° C. in an air atmosphere for 24 hours and thus a composite cathode active material including a 500 nm thick shell consisting of 1.3 parts by weight of the multi-walled carbon nanotubes and 3.7 parts by weight of Al$_2$O$_3$ on 100 parts by weight of the lithium transition metal oxide (Li$_{1.18}$Ni$_{0.17}$Co$_{0.1}$Mn$_{0.56}$O$_2$) core was formed.

Example 11: Preparation of Composite Cathode Active Material

A 2 M aqueous solution of nickel sulfate (NiSO$_4$.6(H$_2$O), available from Aldrich), a 2 M aqueous solution of cobalt sulfate (CoSO$_4$.7(H$_2$O), available from Aldrich), and a 2 M aqueous solution of manganese sulfate (MnSO$_4$.x(H$_2$O), available from Aldrich) were prepared. Then, the aqueous nickel sulfate solution, the aqueous cobalt sulfate solution, and the aqueous manganese sulfate solution were mixed so that the molar ratio of the content of nickel, cobalt, and manganese respectively contained in the aqueous nickel sulfate solution, the aqueous cobalt sulfate solution, and the aqueous manganese sulfate solution became 0.142:0.142: 0.522. The mixed solution was added into 4 L of a 0.2 M NH$_4$OH solution along with a 2 M Na$_2$CO$_3$ solution at a rate of 3 mL/min for 10 hours while maintaining the pH of the mixed solution at pH 8, and the resulting precipitant was filtrated. The precipitant was washed with water, dried, and mixed with Li$_2$CO$_3$ (available from Aldrich) so that the molar ratio of Li:Ni:Co:Mn became 1.19:0.142:0.142:0.522. The resultant was heat treated for 5 hours at 950° C. in an air atmosphere to obtain a lithium transition metal oxide (Li$_{1.19}$Ni$_{0.142}$Co$_{0.142}$Mn$_{0.522}$O$_2$) core with a layered structure.

Then, 5 g of the lithium transition metal oxide core was dispersed in 60.7 mL of 0.05M ammonium fluoride solution. The dispersion was added 0.380 g of AlF$_3$.9H$_2$O to precipitate aluminum fluoride, heat treated at 300° C. in an air atmosphere, and a shell of AlF$_3$ on the lithium transition meta core was formed.

Subsequently, a dispersion, in which 0.1 g of multi-walled carbon nanotubes powder (available from ENANOTEC, average length: 400 nm) was dispersed in 300 mL of acetone, was prepared. The dispersion was dispersed with a core, on which a shell of AlF$_3$ is formed, dried at 120° C. in an air atmosphere for 24 hours, and a composite cathode active material including a 500 nm thick shell of 1.3 parts by weight of the multi-walled carbon nanotubes and 3.7 parts by weight of AlF$_3$ was formed on 100 parts by weight of the lithium transition metal oxide (Li$_{1.18}$Ni$_{0.17}$Co$_{0.1}$Mn$_{0.56}$O$_2$) core.

Comparative Example 1: Preparation of Cathode Active Material

A 2 M aqueous solution of nickel sulfate (NiSO$_4$.6(H$_2$O), available from Aldrich), a 2 M aqueous solution of cobalt sulfate (CoSO$_4$.7(H$_2$O), available from Aldrich), and a 2 M aqueous solution of manganese sulfate (MnSO$_4$.x(H$_2$O), available from Aldrich) were prepared. Then, the aqueous nickel sulfate solution, the aqueous cobalt sulfate solution, and the aqueous manganese sulfate solution were mixed so that the molar ratio of the content of nickel, cobalt, and manganese respectively contained in the aqueous nickel sulfate solution, the aqueous cobalt sulfate solution, and the aqueous manganese sulfate solution became 0.17:0.1:0.56. The mixed solution was added into 4 L of a 0.2 M $NH_4OH$ solution along with a 2 M $Na_2CO_3$ solution at a rate of 3 mL/min for 10 hours while maintaining the pH of the mixed solution at pH 8, and the resulting precipitant was filtrated. The precipitant was washed with water, dried, and mixed with $Li_2CO_3$ (available from Aldrich) so that the molar ratio of Li:Ni:Co:Mn became 1.18:0.17:0.1:0.56. The resultant was heat treated for 5 hours at 950° C. in an air atmosphere to obtain a lithium transition metal oxide ($Li_{1.18}Ni_{0.17}Co_{0.1}Mn_{0.56}O_2$) core with a layered structure.

Comparative Example 2: Preparation of Composite Cathode Active Material

A composite cathode active material was obtained in the same manner as in Example 1 except that 100 parts by weight of lithium transition metal oxide ($Li_{1.18}Ni_{0.17}Co_{0.1}Mn_{0.56}O_2$), and 0.2 parts by weight of $Al_2O_3$ were mixed and pulverized at 3000 RPM for 30 minutes via a dry process by using a Nobilta NOB-MINI (available from Hosokawa), thereby obtaining a composite cathode active material including a shell of $Al_2O_3$ on the lithium transition metal oxide ($Li_{1.18}Ni_{0.17}Co_{0.1}Mn_{0.56}O_2$) core, instead of mixing 100 parts by weight of lithium transition metal oxide ($Li_{1.18}Ni_{0.17}Co_{0.1}Mn_{0.56}O_2$), 1.3 parts by weight of single-walled carbon nanotubes (available from ENANOTEC, purity: ≥90%, average diameter: 2 nm, average length: 30 μm), and 0.2 parts by weight of $Al_2O_3$ and pulverizing at 3000 RPM for 30 minutes via a dry process using a Nobilta NOB-MINI (available from Hosokawa), thereby obtaining a composite cathode active material including a shell of single-walled carbon nanotubes and $Al_2O_3$ on the lithium transition metal oxide ($Li_{1.18}Ni_{0.17}Co_{0.1}Mn_{0.56}O_2$) core.

Comparative Example 3: Preparation of Composite Cathode Active Material

A composite cathode active material was obtained in the same manner as in Example 1 except that 100 parts by weight of lithium transition metal oxide ($Li_{1.18}Ni_{0.17}Co_{0.1}Mn_{0.56}O_2$) and 1.0 part by weight of $Al_2O_3$ were mixed and pulverized at 3000 RPM for 30 minutes via a dry process using a Nobilta NOB-MINI (available from Hosokawa), thereby obtaining a composite cathode active material including a shell of $Al_2O_3$ on the lithium transition metal oxide ($Li_{1.18}Ni_{0.17}Co_{0.1}Mn_{0.56}O_2$) core, instead of mixing 100 parts by weight of lithium transition metal oxide ($Li_{1.18}Ni_{0.17}Co_{0.1}Mn_{0.56}O_2$), 1.3 parts by weight of single-walled carbon nanotubes (available from ENANOTEC, purity: ≥90%, average diameter: 2 nm, average length: 30 μm), and 0.2 parts by weight of $Al_2O_3$, and pulverizing at 3000 RPM for 30 minutes via a dry process using a Nobilta NOB-MINI (available from Hosokawa), thereby obtaining a composite cathode active material including a shell of single-walled carbon nanotubes and $Al_2O_3$ on the lithium transition metal oxide ($Li_{1.18}Ni_{0.17}Co_{0.1}Mn_{0.56}O_2$) core.

Comparative Example 4: Preparation of Composite Cathode Active Material

A composite cathode active material was obtained in the same manner as in Example 1 except that 100 parts by weight of lithium transition metal oxide ($Li_{1.18}Ni_{0.17}Co_{0.1}Mn_{0.56}O_2$) and 1.7 parts by weight of $Al_2O_3$ were mixed and pulverized at 3000 RPM for 30 minutes via a dry process using a Nobilta NOB-MINI (available from Hosokawa), thereby obtaining a composite cathode active material including a shell of $Al_2O_3$ on the lithium transition metal oxide ($Li_{1.18}Ni_{0.17}Co_{0.1}Mn_{0.56}O_2$) core, instead of mixing 100 parts by weight of lithium transition metal oxide ($Li_{1.18}Ni_{0.17}Co_{0.1}Mn_{0.56}O_2$), 1.3 parts by weight of single-walled carbon nanotubes (available from ENANOTEC, purity: ≥90%, average diameter: 2 nm, average length: 30 μm), and 0.2 parts by weight of $Al_2O_3$, and pulverizing at 3000 RPM for 30 minutes via a dry process using a Nobilta NOB-MINI (available from Hosokawa), thereby obtaining a composite cathode active material including a shell of single-walled carbon nanotubes and $Al_2O_3$ on the lithium transition metal oxide ($Li_{1.18}Ni_{0.17}Co_{0.1}Mn_{0.56}O_2$) core.

Comparative Example 5: Preparation of Composite Cathode Active Material

A composite cathode active material was obtained in the same manner as in Example 1 except that 100 parts by weight of lithium transition metal oxide ($Li_{1.18}Ni_{0.17}Co_{0.1}Mn_{0.56}O_2$), 1.3 parts by weight of acetylene black (Denka black, available from Denka's Chemicals Division), and 1.7 parts by weight of $Al_2O_3$ were mixed and pulverized at 3000 RPM for 30 minutes via a dry process using a Nobilta NOB-MINI (available from Hosokawa), thereby obtaining a composite cathode active material including a shell of acetylene black and $Al_2O_3$ on the lithium transition metal oxide ($Li_{1.18}Ni_{0.17}Co_{0.1}Mn_{0.56}O_2$) core, instead of mixing 100 parts by weight of lithium transition metal oxide ($Li_{1.18}Ni_{0.17}Co_{0.1}Mn_{0.56}O_2$), 1.3 parts by weight of single-walled carbon nanotubes (available from ENANOTEC, purity: ≥90%, average diameter: 2 nm, average length: 30 μm), and 0.2 part by weight of $Al_2O_3$, and pulverizing at 3000 RPM for 30 minutes via a dry process using a Nobilta NOB-MINI (available from Hosokawa), thereby obtaining a composite cathode active material including a shell consisting of single-walled carbon nanotubes and $Al_2O_3$ on the lithium transition metal oxide ($Li_{1.18}Ni_{0.17}Co_{0.1}Mn_{0.56}O_2$) core.

Comparative Example 6: Preparation of Composite Cathode Active Material

A composite cathode active material was obtained in the same manner as in Example 1 except that 100 parts by weight of lithium transition metal oxide ($Li_{1.18}Ni_{0.17}Co_{0.1}Mn_{0.56}O_2$), 1.0 part by weight of acetylene black (Denka black, available from Denka's Chemicals Division), and 0.5 parts by weight of $Al_2O_3$ were mixed and pulverized at 3000 RPM for 30 minutes via a dry process using a Nobilta NOB-MINI (available from Hosokawa), thereby obtaining a composite cathode active material including a shell of acetylene black and $Al_2O_3$ on the lithium transition metal oxide ($Li_{1.18}Ni_{0.17}Co_{0.1}Mn_{0.56}O_2$) core, instead of mixing 100 parts by weight of lithium transition metal oxide ($Li_{1.18}Ni_{0.17}Co_{0.1}Mn_{0.56}O_2$), 1.3 parts by weight of single-walled carbon nanotubes (available from ENANOTEC, purity: ≥90%, average diameter: 2 nm, average length: 30 μm), and 0.2 part by weight of $Al_2O_3$, and pulverizing at 3000 RPM for 30 minutes via a dry process using a Nobilta NOB-MINI (available from Hosokawa), thereby obtaining a composite cathode active material including a shell of single-walled carbon nanotubes and $Al_2O_3$ on the lithium transition metal oxide ($Li_{1.18}Ni_{0.17}Co_{0.1}Mn_{0.56}O_2$) core.

Comparative Example 7: Preparation of Composite Cathode Active Material

A composite cathode active material was obtained in the same manner as in Example 1 except that 100 parts by weight of lithium transition metal oxide ($Li_{1.18}Ni_{0.17}Co_{0.1}Mn_{0.56}O_2$) and 1.0 part by weight of multi-walled carbon nanotubes (available from ENANOTEC, purity: ≥95%, average diameter: 20 nm, average length: 25 μm) were mixed and pulverized at 3000 RPM for 30 minutes via a dry process using a Nobilta NOB-MINI (available from Hosokawa), thereby obtaining a composite cathode active material including a shell of the multi-walled carbon nanotubes on the lithium transition metal oxide ($Li_{1.18}Ni_{0.17}Co_{0.1}Mn_{0.56}O_2$) core, instead of mixing 100 parts by weight of lithium transition metal oxide ($Li_{1.18}Ni_{0.17}Co_{0.1}Mn_{0.56}O_2$), 1.3 parts by weight of single-walled carbon nanotubes (available from ENANOTEC, purity: ≥90%, average diameter: 2 nm, average length: 30 μm), and 0.2 part by weight of $Al_2O_3$, and pulverizing at 3000 RPM for 30 minutes via a dry process using a Nobilta NOB-MINI (available from Hosokawa), thereby obtaining a composite cathode active material including a shell of single-walled carbon nanotubes and $Al_2O_3$ on the lithium transition metal oxide ($Li_{1.18}Ni_{0.17}Co_{0.1}Mn_{0.56}O_2$) core.

Comparative Example 8: Preparation of Composite Cathode Active Material

A composite cathode active material was obtained in the same manner as in Example 1 except that 100 parts by weight of lithium transition metal oxide ($Li_{1.18}Ni_{1.17}Co_{0.1}Mn_{0.56}O_2$) and 1.3 parts by weight of multi-walled carbon nanotubes (available from ENANOTEC, purity: ≥95%, average diameter: 20 nm, average length: 25 μm) were mixed and pulverized at 3000 RPM for 30 minutes via a dry process using a Nobilta NOB-MINI (available from Hosokawa), thereby obtaining a composite cathode active material including a shell of the multi-walled carbon nanotubes on the lithium transition metal oxide ($Li_{1.18}Ni_{0.17}Co_{0.1}Mn_{0.56}O_2$) core, instead of mixing 100 parts by weight of lithium transition metal oxide ($Li_{1.18}Ni_{1.17}Co_{0.1}Mn_{0.56}O_2$), 1.3 parts by weight of single-walled carbon nanotubes (available from ENANOTEC, purity: ≥90%, average diameter: 2 nm, average length: 30 μm), and 0.2 part by weight of $Al_2O_3$, and pulverizing at 3000 RPM for 30 minutes via a dry process using a Nobilta NOB-MINI (available from Hosokawa), thereby obtaining a composite cathode active material including a shell of single-walled carbon nanotubes and $Al_2O_3$ on the lithium transition metal oxide ($Li_{1.18}Ni_{0.17}Co_{0.1}Mn_{0.56}O_2$) core.

Comparative Example 9: Preparation of Cathode Active Material

A 2 M aqueous solution of nickel sulfate ($NiSO_4 \cdot 6(H_2O)$, available from Aldrich), a 2 M aqueous solution of cobalt sulfate ($CoSO_4 \cdot 7(H_2O)$, available from Aldrich), and a 2 M aqueous solution of manganese sulfate ($MnSO_4 \cdot x(H_2O)$, available from Aldrich) were prepared. Then, the aqueous nickel sulfate solution, the aqueous cobalt sulfate solution, and the aqueous manganese sulfate solution were mixed so that the molar ratio of the content of nickel, cobalt, and manganese respectively contained in the aqueous nickel sulfate solution, the aqueous cobalt sulfate solution, and the aqueous manganese sulfate solution became 0.142:0.142:0.522. The mixed solution was added into 4 L of a 0.2 M $NH_4OH$ solution along with a 2 M $Na_2CO_3$ solution at a rate of 3 mL/min for 10 hours while maintaining the pH of the mixed solution at pH 8, and the resulting precipitant was filtrated. The precipitant was washed with water, dried, and mixed with $Li_2CO_3$ (available from Aldrich) so that the molar ratio of Li:Ni:Co:Mn became 1.19:0.142:0.142:0.522. The resultant was heat treated for 5 hours at 950° C. in an air atmosphere to obtain a lithium transition metal oxide ($Li_{1.19}Ni_{0.142}Co_{0.142}Mn_{0.522}O_2$) core with a layered structure.

Comparative Example 10: Preparation of Composite Cathode Active Material

A 2 M aqueous solution of nickel sulfate ($NiSO_4 \cdot 6(H_2O)$, available from Aldrich), a 2 M aqueous solution of cobalt sulfate ($CoSO_4 \cdot 7(H_2O)$, available from Aldrich), and a 2 M aqueous solution of manganese sulfate ($MnSO_4 \cdot x(H_2O)$, available from Aldrich) were prepared. Then, the aqueous nickel sulfate solution, the aqueous cobalt sulfate solution, and the aqueous manganese sulfate solution were mixed so that the molar ratio of the content of nickel, cobalt, and manganese respectively contained in the aqueous nickel sulfate solution, the aqueous cobalt sulfate solution, and the aqueous manganese sulfate solution became 0.142:0.142:0.522. The mixed solution was added into 4 L of a 0.2 M $NH_4OH$ solution along with a 2 M $Na_2CO_3$ solution at a rate of 3 mL/min for 10 hours while maintaining the pH of the mixed solution at pH 8, and the resulting precipitant was filtrated. The precipitant was washed with water, dried, and mixed with $Li_2CO_3$ (available from Aldrich) so that the molar ratio of Li:Ni:Co:Mn became 1.19:0.142:0.142:0.522. The resultant was heat treated for 5 hours at 950° C. in an air atmosphere to obtain a lithium transition metal oxide ($Li_{1.19}Ni_{0.142}Co_{0.142}Mn_{0.522}O_2$) core with a layered structure.

Then, 100 parts by weight of lithium transition metal oxide ($Li_{1.19}Ni_{0.142}Co_{0.142}Mn_{0.522}O_2$), and 0.5 part by weight of $AlF_3$ were mixed and pulverized at 3000 RPM for 30 minutes via a dry process using a Nobilta NOB-MINI (available from Hosokawa), thereby obtaining a composite cathode active material including a shell of $AlF_3$ on the lithium transition metal oxide ($Li_n9Ni_{0.142}Co_{0.142}Mn_{0.522}O_2$) core.

Preparation of Coin-Type Half Cell

Example 12: Preparation of Coin-Type Half Cell

The composite cathode active material powder of Example 1 and carbon conductive material (Denka black) at a weight ratio of 85:7.5 were uniformly mixed, and added a pyrrolidone solution containing a polyvinylidene fluoride (PVDF) binder, thereby obtaining a slurry having a weight ratio of 86:8:6 between the active material:the carbon conductive material:the binder.

The slurry was coated on top of a 15 μm thick aluminum foil via a bar coating process to have a thickness of 40-50 μm, dried, and dried again at 110° C. in vacuum, and a sheet-type cathode electrode was obtained. The cathode electrode was rolled by a roll press to prepare a cathode for a coin-type cell, wherein the capacity of the cathode was 0.8 $mAh/cm^2$.

A coin-type half cell (CR2032 type) with a diameter of 12 mm was prepared by using the cathode.

In preparing the coin-type half cell, a lithium metal was used as a counter electrode, and electrolytes were prepared by dissolving 1.3M $LiPF_6$ into a mixed solution of ethylene carbonate (EC):diethyl carbonate (DEC):ethylmethylcarbonate (EMC) with a volume ratio of 3:5:2.

Examples 13-23: Preparation of Coin-Type Half Cell

Coin-type half cells were prepared in the same manner as in Example 12 except that the composite cathode active materials of Examples 2-11 were respectively used instead of the composite cathode active material of Example 1.

Comparative Examples 11-20: Preparation of Coin-Type Half Cell

Coin-type half cells were prepared in the same manner as in Example 12 except that the cathode active material or the composite cathode active material of Comparative Examples 1-10 were respectively used instead of the composite cathode active material of Example 1.

Preparation of Coin-Type Full Cell

Example 23: Preparation of Coin-Type Full Cell

The composite cathode active material powder of Example 1 and carbon conductive material (Denka black) at a weight ratio of 85:7.5 were uniformly mixed, and added a pyrrolidone solution containing a polyvinylidene fluoride (PVDF) binder, thereby obtaining a slurry having a weight ratio of 86:8:6 between the active material:the carbon conductive material:the binder.

The slurry was coated on top of a 15 μm thick aluminum foil via a bar coating process to have a thickness of 40-50 μm, dried, and dried again at 110° C. in vacuum, thereby obtaining a sheet-type cathode electrode. The cathode electrode was rolled by a roll press to prepare a cathode for a coin-type cell, wherein the capacity of the cathode was 0.8 mAh/cm².

A coin-type full cell was prepared by using the cathode, a graphite anode with a diameter of 1.6 cm, electrolytes prepared by dissolving 1.3M $LiPF_6$ into a mixed solution of ethylene carbonate ("EC"):diethyl carbonate ("DEC"):ethylmethylcarbonate ("EMC") with a volume ratio of 3:5:2, and a polyethylene separator.

Examples 24-34: Preparation of Coin-Type Full Cell

Coin-type full cells were prepared in the same manner as in Example 23 except that composite cathode active materials of Examples 2-9 were respectively used instead of the composite cathode active material of Example 1.

Comparative Examples 21-30: Preparation of Coin-Type Full Cell

Coin-type full cells were prepared in the same manner as in Example 23 except that composite cathode active materials of Comparative Examples 1-10 were respectively used instead of the composite cathode active material of Example 1.

Analysis of Cathode Active Material and Cathode Surface

Figure 2:
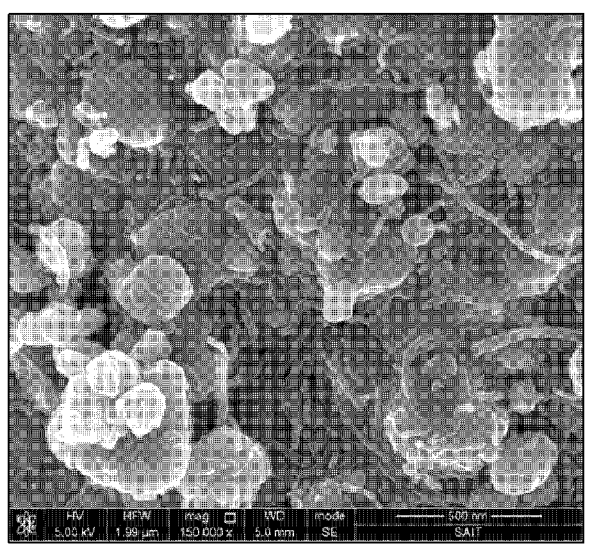
FIG. 2 is a Scanning Electron Microscopy ("SEM") picture at a 150,000× magnification of a composite cathode active material according to Example 6.

Analysis Example 1: Analysis of Scanning Electron Microscope ("SEM") Pictures The surface of the composite cathode active material of Example 6 was observed under an SEM (SEM, available from Hitachi, Model: S-5500) at a 150,000 magnification. The result is shown in FIG. 2. Referring to FIG. 2, it was confirmed that carbon nanotubes and white $Al_2O_3$ particles were coated on the lithium metal oxide ($Li_{1.18}Ni_{0.17}Co_{0.1}Mn_{0.56}O_2$) core of the composite cathode active material of Example 6. Furthermore, the carbon nanotubes and white $Al_2O_3$ particles are present in an independent phase, and part of them are formed as the composite therein.

Analysis Example 2: Analysis of Ion Couple Plasma ("ICP")

The surfaces of composite cathode active materials or cathode active materials of Examples 1-3 and Comparative Example 1 were measured in terms of their respective Al content via ICP analysis. The Al amount refers to "parts by weight of Al relative to 100 parts by weight of a lithium transition metal oxide ($Li_{1.18}Ni_{0.17}Co_{0.1}Mn_{0.56}O_2$) core". The results are shown in Table 1 below. The ICP analysis was performed by using a device Model ICPS-8100 (available from Shimadzu).

TABLE 1

| Category | Al content (mole fraction) |
| --- | --- |
| Example 1 | 0.11 |
| Example 2 | 0.24 |
| Example 3 | 0.46 |
| Comparative Example 1 | 0.00 |

Referring to Table 1, it was confirmed that the Al contents on the surface of the composite cathode active materials of Examples 1-3 were 0.11, 0.24, and 0.46 parts by weight, respectively, relative to 100 parts by weight of the lithium transition metal oxide ($Li_{1.18}Ni_{0.17}Co_{0.1}Mn_{0.56}O_2$) core. Additionally, it was confirmed that Al is not present on the surface of the cathode active material of Comparative Example 1.

Analysis Example 3: Thermogravimetric Analysis ("TGA")

The carbon content in the composite cathode active material or the cathode active material of Example 6 and Comparative Examples 1 and 7 was calculated by using TGA (available from TA instrument, SDF-2960). The carbon content refers to "parts by weight of carbon relative to 100 parts by weight of a lithium transition metal oxide ($Li_{1.18}Ni_{0.17}Co_{0.1}Mn_{0.56}O_2$) core". The results are shown in FIG. 4.

The experiments were performed as follows: 7±0.5 mg of the composite cathode active material or the cathode active material of Example 6 and Comparative Examples 1 and 7 were respectively loaded on a sealed aluminum pan, and heated in an air atmosphere from 25° C. to 600° C. at a rate of 10° C./min.

Figure 4:
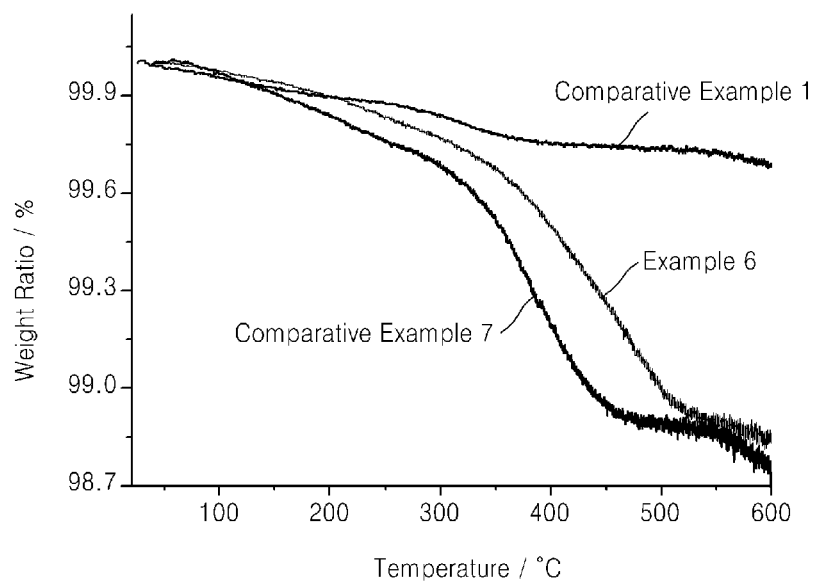
FIG. 4 is a graph of weight percent (percent) versus temperature (° C.) illustrating results of thermogravimetric analysis of the composite cathode active materials according to Example 6, and Comparative Examples 1 and 7.

Referring to FIG. 4, it was confirmed that the carbon content of the composite cathode active material of Example 6 and Comparative Example 7 was about 1.0 part by weight relative to 100 parts by weight of a lithium transition metal oxide ($Li_{1.18}Ni_{0.17}Co_{0.1}Mn_{0.56}O_2$) core of Comparative Example 1.

Analysis Example 4: X-Ray Photoelectron Spectroscopy ("XPS") Analysis

The (composite) cathode active materials of Examples 5-6 and Comparative Example 1 were dried at 100° C. for 4 hours under vacuum, and XPS analysis was performed. The results are shown in Table 2 below.

The XPS analysis was performed by using a Quantum 2000 Scanning ESCA Microprobe (available from Physical Electronics Co.), wherein the X-ray source was monochrome Al-Kα ray (1486.6 eV, 27.7 W), the area of measurement was 0.2 mm, discharging angle were set at 45°, and the spectrum at each core level of C1s and Al2p was obtained. Based on the above, the concentration of carbon nanotubes and $Al_2O_3$ on the surfaces of the composite cathode active materials and the cathode active materials of Examples 5-6 and Comparative Example 1 were integrated and sensitivity factors were divided and then analyzed, respectively.

TABLE 2

| Category | C1s Conc. (atm %) | Al2p Conc. (atm %) |
|---|---|---|
| Example 5 | 48.35 | 1.84 |
| Example 6 | 51.39 | 5.76 |
| Comparative Example 1 | 17.64 | 0 |

Referring to Table 2, it was confirmed that the C1s concentration and the Al2p concentration on the surfaces of the composite cathode active materials of Examples 5-6 were much higher than the C1s concentration and the Al2p concentration on the surface of Comparative Example 1. Accordingly, it was confirmed that carbon nanotubes and $Al_2O_3$ were coated on the surfaces of the composite cathode active materials of Examples 5-6.

Evaluation of Characteristics of Battery

Evaluation Example 1: Evaluation of Characteristics of Charge/Discharge Rate The coin-type half cells of Examples 12 and 15 and Comparative Examples 11-14 were charged at 25° C. under the conditions of constant current (0.5 C) and constant voltage (4.5V, 0.05 C cut-off), and rested for 10 minutes. Then, the cells were discharged under constant current (0.2 C, 0.5 C, 1 C, or 2 C) until it reached 2.5 V. That is, the discharge rate characteristics of coin-type half cells of Examples 12 and 15, and Comparative Examples 11-14 were evaluated according to the variation in discharge rate from 0.2 C, 0.5 C, 1 C, or 2 C. The results are shown in Table 3 below. 'C-rate' is a discharge rate of a cell, which is obtained by dividing the total capacity of a given cell by the total discharge hours. In Table 3 below, the discharge rate characteristics were obtained by Equation 1 as below:

Discharge rate characteristics (%)=[(Discharge capacity at 2 C)/(Discharge capacity at 0.2 C)]× 100    Equation 1

TABLE 3

| Category | Discharge capacity at 0.2 C (mAh/g) | Discharge capacity at 2 C (mAh/g) | Discharge rate characteristics (%) |
|---|---|---|---|
| Example 12 | 236.6 | 192.2 | 81.2 |
| Example 15 | 230.7 | 181.7 | 78.8 |
| Comparative Example 11 | 232.8 | 169.5 | 72.8 |
| Comparative Example 12 | 219.3 | 143.6 | 65.5 |
| Comparative Example 13 | 214.6 | 131.9 | 61.4 |
| Comparative Example 14 | 162.6 | 96.8 | 59.5 |

Referring to Table 3, the discharge rate characteristics of the coin-type half cells prepared in Examples 12 and 15 were superior to those of coin-type half cells prepared in Comparative Examples 11-14.

In addition, the discharge rate characteristics of the coin-type full cells of Examples 23 and 27, and Comparative Example 21 were also analyzed under the same experimental conditions as above. The results are shown in Table 4 below. The discharge rate characteristics in Table 4 were also obtained by Equation 1 as above.

TABLE 4

| Category | Discharge capacity at 0.2 C (mAh/g) | Discharge capacity at 2 C (mAh/g) | Discharge rate characteristics (%) |
|---|---|---|---|
| Example 23 | 209.7 | 154.9 | 73.9 |
| Example 27 | 206.7 | 152.1 | 73.6 |
| Comparative Example 21 | 213.2 | 153.2 | 71.8 |

Referring to Table 4, it was confirmed that the discharge rate characteristics of the coin-type full cells of Examples 23 and 27 were superior to that of Comparative Example 21.

Evaluation Example 2: Evaluation of Lifetime Characteristics

For the coin-type half cells of Examples 12, 15, and 18-20, and Comparative Examples 11-14 and 19-20, formation charge/discharge were performed twice at room temperature. In the first formation, the coin-type half cells were charged until the voltage reached 4.6V with 0.1 C. Then, it was discharged under constant current until the voltage reached 2.5 V with 0.1 C.

The cells completed with the formation charge/discharge were discharged until they reached 2.5 V with 0.2 C, charge/discharge conditions were set as the standard charge/discharge conditions, and then discharge capacity was set as the standard capacity.

Then, after charging the cells with 1 C in the above charging form, the cells were discharged until they reached 2.5 V with 1 C, and the discharge capacity (i.e., the discharge capacity at the first cycle) was measured. The above charging and discharging were performed repeatedly, and the discharge capacity in each cycle, and the discharge capacity for the $55^{th}$ cycle for the coin-type half cells of Examples 12 and 15 and Comparative Examples 11-14, the discharge capacity for the $40^{th}$ cycle for the coin-type half cells of Examples 18-20 and Comparative Examples 19-20 were measured. Based on the above results, the lifetime characteristics of the coin-type half cells of Examples 12, 15, and 18-20, and Comparative Examples 11-14 and 19-20 were evaluated. The results are shown in FIGS. 5a and 5b.

Figure 5A:
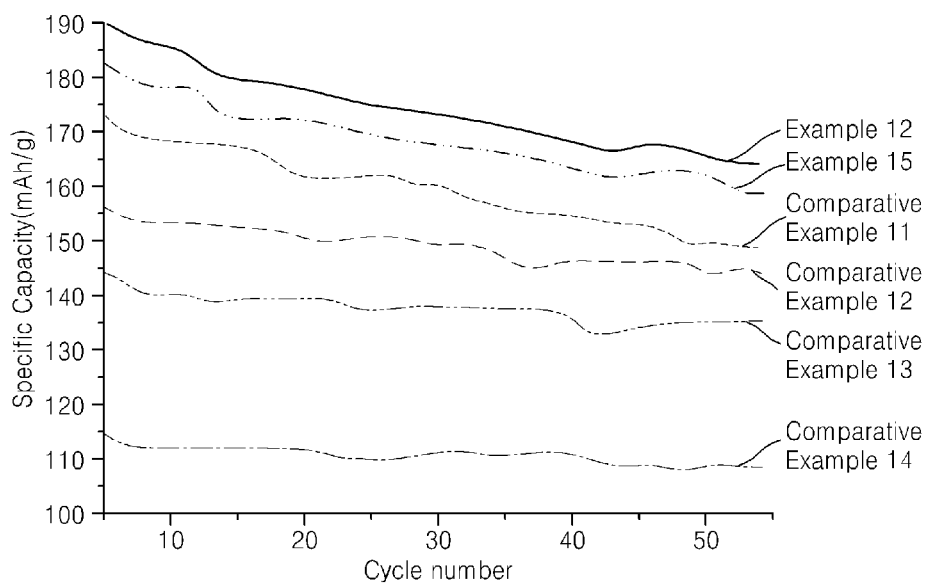
FIG. 5a is a graph of specific capacity (milliampere-hours per gram, mAh/g) versus cycle number illustrating the specific capacity of coin-type half cells according to Examples 12, 15, and Comparative Examples 11-14 with respect to the number of cycles
Figure 5B:
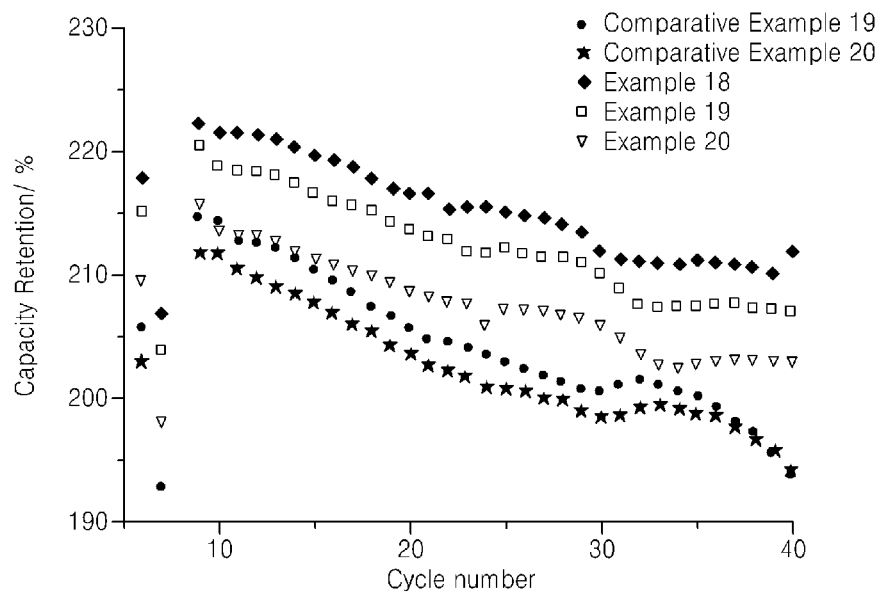
FIG. 5b is a graph of capacity retention (percent, %) versus cycle number illustrating specific capacity of coin-type half cells according to Examples 18-20, and Comparative Examples 19 and 20 with respect to the number of cycles.

Referring to FIGS. 5a and 5b, lifetime characteristics of the coin-type half cells prepared in Examples 12, 15, and 18-20 were superior to those of the coin-type half cells prepared in Comparative Examples 11-14 and 19-20.

Figure 6:
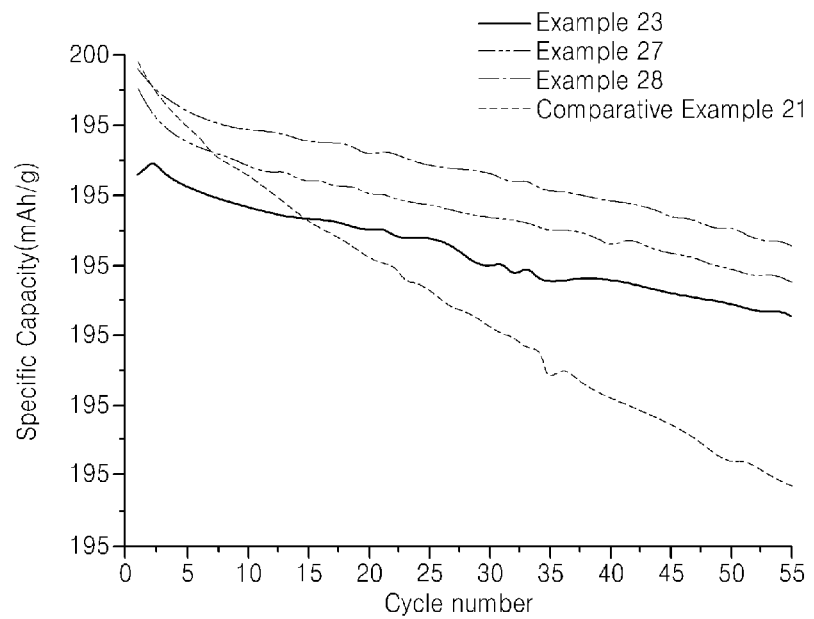
FIG. 6 is a graph of specific capacity (milliampere-hours per gram, mAh/g) versus cycle number illustrating the specific capacity of coin-type full cells according to Examples 23, 27-28, and Comparative Example 21 with respect to the number of cycles.
Figure 7:
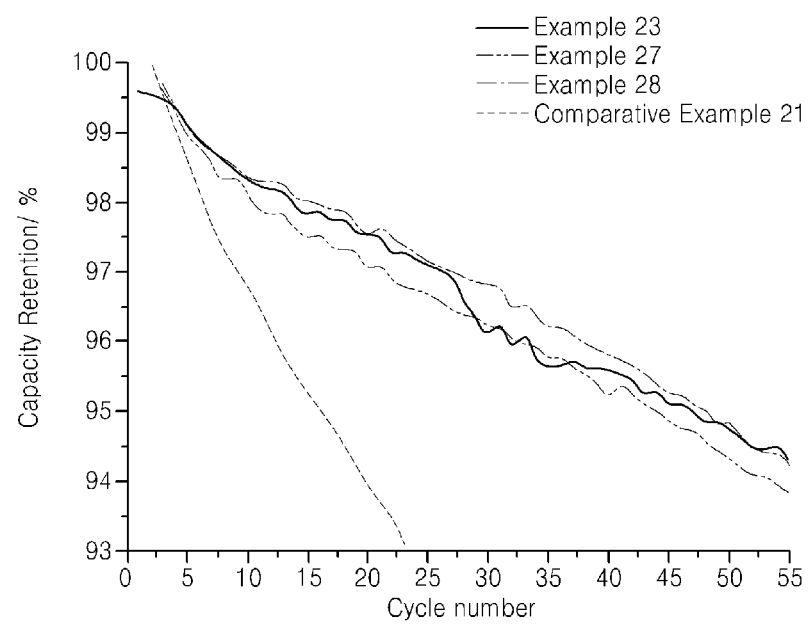
FIG. 7 is a graph of capacity retention (percent, %) versus cycle number illustrating the capacity retention rate of coin-type full cells according to Examples 23, 27-28, and Comparative Example 21 with respect to the number of cycles.

Additionally, experiments were performed for the coin-type full cells of Examples 23 and 27-28, and Comparative Example 21, formation charge/discharge under the same conditions as described above, and the discharge capacity of the coin-type full cells was measured at each cycle and the 55$^{th}$ cycle. Based on the above results, the respective capacity retention rate was calculated, and the lifetime characteristics of the coin-type full cells of Examples 23 and 27-28, and Comparative Example 21 were evaluated therefrom. The results are shown in FIGS. 6-7 and Table 5. The capacity retention rate was obtained by using Equation 2.

Capacity retention rate (%)=[(Discharge capacity at 55$^{th}$ cycle/Discharge capacity at the 1$^{st}$ cycle)]× 100    Equation 2

TABLE 5

| Category | Discharge capacity at the 1$^{st}$ cycle (mAh) | Discharge capacity at the 55$^{th}$ cycle (mAh) | Capacity retention rate (%) |
|---|---|---|---|
| Example 23 | 199.64 | 180.63 | 90.48 |
| Example 27 | 197.65 | 183.81 | 93.00 |
| Example 28 | 199.01 | 186.43 | 93.68 |
| Comparative Example 21 | 197.01 | 169.74 | 86.16 |

Referring to FIGS. 6 and 7, and Table 5, the lifetime characteristics of the coin-type full cells prepared in Examples 23, 27, and 28 were superior to that of the coin-type full cell prepared in Comparative Example 21.

It should be understood that the exemplary embodiments described therein should be considered in a descriptive sense only and not for purposes of limitation. Descriptions of features, advantages, or aspects within each embodiment should typically be considered as available for other similar features, advantages, or aspects in other embodiments.

What is claimed is:

1. A composite cathode active material comprising:
    a core comprising a composite oxide capable of intercalation and deintercalation of lithium, wherein the composite oxide comprises a lithium transition metal oxide represented by $x$Li[Li$_{1/3}$Me$_{2/3}$]O$_2$-(1-$x$)LiMe'O$_2$    Formula 1 wherein in Formula 1, x is 0<x≤0.8, Me is Mn, Mo, W, V, Ti, Zr, Ru, Rh, Pd, Os, Ir, Pt, or a combination thereof, and Me' is Ni, Mn, Co, or a combination thereof, $y$Li[Li$_{1/3}$((M1)$_a$(M2)$_b$(M$n$)$_c$)$_{2/3}$]O$_2$-(1-$y$)LiMe'O$_2$    Formula 2 wherein in Formula 2, a is 0≤a≤⅓, b is 0≤b≤⅓, and a+b+c=1, y is 0<y≤0.8, M1 is Ni, Cu, Zn, Co, Cr, Fe, Mg, or a combination thereof, and M2 is Mo, W, V, Ti, Zr, Ru, Rh, Pd, Os, Ir, Pt, or a combination thereof, Li$_d$Co$_{1-e-g}$Ni$_e$(M3)$_g$O$_{2-j}$(X1)$_j$    Formula 3 wherein in Formula 3, d is 0.9≤d≤1.6, e is 0≤e≤1, g is 0≤g≤0.6, j is 0≤j≤1, M3 is Mn, Ni, Co, Cu, Mg, Na, Ca, Ti, Zn, Ga, Ge, Al, Cr, Sr, Mo, W, V, Zr, Ru, Rh, Pd, Os, Ir, Ag, Au, Hf, Sn, Pt, or a combination thereof, and X1 is O, F, S, P, or a combination thereof, Li$_p$Mn$_{2-q}$(M4)$_q$O$_{4-t}$(X2)$_t$    Formula 4 wherein in Formula 4, p is 0.9≤p≤1.6, q is 0≤q≤1, t is 0≤t≤1, M4 is Mn, Ni, Co, Cu, Mg, Na, Ca, Ti, Zn, Ga, Ge, Al, Cr, Mg, Sr, Mo, W, V, Zr, Ru, Rh, Pd, Os, Ir, Ag, Au, Hf, Sn, Pt, or a combination thereof; and X2 is O, F, S, P, or a combination thereof;
    a carbon nanostructure disposed directly on an outer surface of the core; and
    a particle of a material which is chemically inert to lithium also disposed directly on an outer surface of the core,
    wherein the contents of the carbon nanostructure and the material which is chemically inert to lithium is about 0.001 parts by weight to about 10 parts by weight based on 100 parts by weight of a composite oxide capable of intercalation/deintercalation of lithium, and
    wherein the material which is chemically inert to lithium consists of an inorganic material represented by Formula 5:

(M5)O$_x$    Formula 5 wherein, in Formula 5, M5 is Al, V, Nb, Mo, W, Mn, Cr, Zr, Si, Mg, Ca, Y, Ba, B, Ta, In, Ag, Ti, Fe, Co, Ni, Cu, Zn, Sn, La, or a combination thereof, and x is 0<x≤6.

2. The composite cathode active material according to claim 1, wherein the carbon nanostructure and the material which is chemically inert lithium are in the form of a shell, which is on the core.

3. The composite cathode active material according to claim 2, wherein a thickness of the shell is from about 1 nanometer to about 10 micrometer.

4. The composite cathode active material according to claim 1, wherein the composite oxide capable of intercalation/deintercalation of lithium includes at least one selected from an over-lithiated layered oxide, a lithium manganese oxide, a lithium nickel manganese oxide, a lithium nickel cobalt manganese oxide, a lithium manganese oxide doped with a nonmetal element, a lithium nickel manganese oxide doped with a nonmetal element, a lithium nickel cobalt manganese oxide doped with a nonmetal element, and combinations thereof.

5. The composite cathode active material according to claim 1, wherein the carbon nanostructure comprises a carbon nanocone, a carbon nanohorn, a carbon nanotube, or a combination thereof.

6. The composite cathode active material according to claim 1, wherein the carbon nanostructure comprises a single-walled carbon nanotube, a multi-walled carbon nanotube, or combination thereof.

7. The composite cathode active material according to claim 1, wherein the material which is chemically inert to lithium has an average particle size from about 1 nanometer to about 900 nanometers.

8. The composite cathode active material according to claim 1, wherein a weight ratio between the carbon nanostructure and the material which is chemically inert to lithium is from 1:1 to 10:1.

9. A lithium battery comprising
    a cathode;
    electrolyte; and
    an anode;
    wherein the cathode includes the composite cathode active material according to claim 1.

10. The lithium battery according to claim 9, wherein an operational voltage of the composite cathode active material is equal to or greater than 4.3 volts versus lithium.

11. A method of manufacturing a composite cathode active material, the method comprising:

providing a composite oxide core capable of intercalation and deintercalation of lithium; and surface treating the composite oxide core to manufacture the composite cathode active material of claim 1.

12. The method of manufacturing a composite cathode active material according to claim 11, wherein the surface treatment comprises a dry process comprising ball milling, hybridization, or mechanofusion.

13. The method of manufacturing a composite cathode active material according to claim 11, wherein the surface treatment comprises a wet process comprising spraying, co-precipitation, or dipping.

14. The method of manufacturing a composite cathode active material according to claim 11, wherein the content of the carbon nanostructure and the content of the material which is chemically inert to lithium are each independently from about 0.001 parts by weight to about 10 parts by weight, based on 100 parts by weight of the composite oxide capable of intercalation and deintercalation of lithium.

15. The method of manufacturing a composite cathode active material according to claim 11, wherein a weight ratio between the carbon nanostructure and the material which is chemically inert to lithium is from about 1:1 to about 5:1.

16. The composite cathode active material according to claim 1, wherein the carbon nanostructure and the particle of a material which is chemically inert to lithium partially cover the outer surface of the core.

17. A composite cathode active material comprising:

a core comprising a composite oxide capable of intercalation and deintercalation of lithium; and a shell comprising a carbon nanostructure and a particle of a material which is chemically inert to lithium on the core, wherein the carbon nanostructure comprises a single-walled carbon nanotube, a multi-walled carbon nanotube, or a combination thereof, wherein the shell is disposed directly on an outer surface of the core, wherein the shell partially covers the outer surface of the core, wherein the material which is chemically inert to lithium comprises an inorganic material represented by Formula 5, Formula 6, or a combination thereof:

$$(M5)O_x \qquad \text{Formula 5}$$

wherein, in Formula 5, M5 is Al, V, Nb, Mo, W, Mn, Cr, Zr, Si, Mg, Ca, Y, Ba, B, Ta, In, Ag, Ti, Fe, Co, Ni, Cu, Zn, Sn, La, or a combination thereof, and x is 0<x≤6; and $$(M6)F_y \qquad \text{Formula 6}$$

wherein, in Formula 6, M6 is Al, V, Nb, Mo, W, Mn, Cr, Zr, Si, Mg, Ca, Y, Ba, B, Ta, In, Ag, Ti, Fe, Co, Ni, Cu, Zn, Sn, La, or a combination thereof, and y is 0<y≤6, and wherein a weight ratio between the carbon nanostructure and the inorganic material represented by Formula 5, Formula 6, or a combination thereof is from 1.3:1 to 6.5:1.

* * * * *